United States Patent
Tierney et al.

(10) Patent No.: US 10,565,162 B2
(45) Date of Patent: Feb. 18, 2020

(54) SYSTEMS AND METHODS FOR CUSTOMIZED OPERATING SYSTEM CONVERSION

(71) Applicant: MasterCard International Incorporated, Purchase, NY (US)

(72) Inventors: Gerard Tierney, O'Fallon, MO (US); Wesley Alan Szwarc, Moscow Mills, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 370 days.

(21) Appl. No.: 15/667,093

(22) Filed: Aug. 2, 2017

(65) Prior Publication Data

US 2019/0042583 A1 Feb. 7, 2019

(51) Int. Cl.
- *G06F 16/00* (2019.01)
- *G06F 16/11* (2019.01)
- *G06F 16/10* (2019.01)
- *G06F 9/455* (2018.01)

(52) U.S. Cl.
CPC ............ *G06F 16/116* (2019.01); *G06F 16/10* (2019.01); *G06F 9/455* (2013.01)

(58) Field of Classification Search
CPC ......... G06F 16/116; G06F 16/10; G06F 9/455
USPC .......................................................... 707/634
See application file for complete search history.

(56) References Cited

U.S. PATENT DOCUMENTS

| | | | |
|---|---|---|---|
| 6,101,585 A * | 8/2000 | Brown ................ | G06F 11/1451 711/162 |
| 6,128,734 A | 10/2000 | Gross et al. | |
| 6,282,641 B1 | 8/2001 | Christensen | |
| 7,010,584 B1 | 3/2006 | Craft | |
| 7,353,240 B1 | 4/2008 | Takamoto et al. | |
| 7,356,679 B1 * | 4/2008 | Le ....................... | G06F 9/45558 713/1 |
| 8,041,888 B2 * | 10/2011 | Rajan ..................... | G06F 16/10 711/112 |

(Continued)

FOREIGN PATENT DOCUMENTS

EP 1280058 A2 1/2003

OTHER PUBLICATIONS

PCT International Search Report and Written Opinion, Application No. PCT/US2018/041945, dated Oct. 22, 2018, 14 pps.

*Primary Examiner* — Hanh B Thai
(74) *Attorney, Agent, or Firm* — Armstrong Teasdale LLP

(57) ABSTRACT

An operating system conversion (OSC) computing device generates a custom archive file including an OS image file associated with a second operating system (OS) for a host computing device having a first OS. The OSC computing device formats a data storage device of the host computing device to include a first partition associated with the first OS and a second partition associated with the second OS, transmits the custom archive file to the host computing device, and generates, using the custom archive file, a loopback file system mounted to the host computing device to emulate a physical data storage device. The OS image file is accessible though the loopback file system. The OSC computing device stores the OS image file within an install directory of the second partition and converts an OS operating on the host computing device from the first OS to the second OS.

22 Claims, 6 Drawing Sheets

(56) References Cited

U.S. PATENT DOCUMENTS

| | | | |
|---|---|---|---|
| 8,209,680 B1* | 6/2012 | Le | G06F 9/45558 |
| | | | 717/174 |
| 8,869,139 B2* | 10/2014 | Le | G06F 9/45558 |
| | | | 717/174 |
| 8,874,889 B2 | 10/2014 | Teng et al. | |
| 9,311,313 B2* | 4/2016 | Le | G06F 9/45558 |
| 9,430,223 B2 | 8/2016 | Filali-Adib et al. | |
| 9,940,330 B2* | 4/2018 | Le | G06F 9/45558 |
| 2001/0018717 A1 | 8/2001 | Shimotono | |
| 2005/0071837 A1* | 3/2005 | Butt | G06F 8/65 |
| | | | 717/168 |
| 2008/0307215 A1 | 12/2008 | Willems | |
| 2011/0040958 A1 | 2/2011 | Liang et al. | |
| 2012/0265959 A1* | 10/2012 | Le | G06F 9/45558 |
| | | | 711/162 |
| 2014/0359618 A1* | 12/2014 | Fontignie | G06F 8/63 |
| | | | 718/1 |
| 2015/0012570 A1* | 1/2015 | Le | G06F 9/45558 |
| | | | 707/823 |
| 2016/0224572 A1* | 8/2016 | Le | G06F 9/45558 |

\* cited by examiner

SYSTEMS AND METHODS FOR CUSTOMIZED OPERATING SYSTEM CONVERSION

BACKGROUND

The field of the present disclosure relates generally to converting an operating system operating on a host computing device, and more specifically, to network-based systems and methods for remote-customizable conversion of an operating system operating on a host computing device.

Servers and other data storage devices are used to store and communicate data for various applications. For example, servers may be used to store data associated with a payment network that processes transactions using payment cards (e.g., credit or debit cards) and payment accounts. The servers typically include a plurality of data storage devices (e.g., hard disk drives and solid state drives) to provide data redundancy and/or increased data storage. An operating system is installed on each server to enable the server to perform standard functions, such as communicate with other devices, store data, and display a graphical user interface (GUI). The operating system includes a set of protocols for controlling each function so that data is received, processed, and transmitted according to a specific format supported by the operating system. For example, an operating system may include one or more file system architectures for connected storage devices to store data, such as a file allocation table (FAT), a fourth extended filesystem (ext4), and/or a new technology file system (NTFS).

In some cases, the servers may be scheduled to change or convert operating systems (i.e., due to lack of support, alternative operating systems, etc.). However, converting between operating systems may cause issues with data stored in a file system architecture that is not supported by the new operating system. Accordingly, the server may require on-site technical overview, additional data storage devices, and/or one or more reboots to install the new operating system. The down time caused by the installation and conversion process may be long and inconvenient for users attempting to access the server and the data stored by the server, particularly for data critical to a particular process or service performed by the server.

BRIEF DESCRIPTION

In one aspect, an operating system conversion (OSC) computing device includes at least one processor and a memory in communication with the at least one processor. The at least one processor is programmed to generate a custom archive file for a host computing device having a first operating system (OS). The custom archive file includes an OS image file associated with a second OS. The at least one processor is further programmed to format a first data storage device of the host computing device to include a first partition associated with the first OS and a second partition associated with the second OS, transmit the custom archive file to the host computing device, and generate, using the custom archive file, a loopback file system mounted to the host computing device to emulate a physical data storage device. The OS image file is accessible though the loopback file system. The at least one processor is further programmed to store the OS image file within an install directory of the second partition and convert an OS operating on the host computing device from the first OS to the second OS. The OS image file installs the second OS on a second data storage device of the host computing device from the install directory.

In another aspect, a method for converting a host computing device from a first OS to a second OS is provided. The method is at least partially performed by an OS conversion (OSC) computing device. The host computing device includes a first data storage device. The method includes generating a custom archive file for the host computing device. The custom archive file includes an OS image file associated with the second OS. The method further includes formatting the first data storage device to include a first partition associated with the first OS and a second partition associated with the second OS, transmitting the custom archive file to the host computing device, generating, using the custom archive file, a loopback file system mounted to the host computing device to emulate a physical data storage device. The OS image file is accessible though the loopback file system. The method further includes storing the OS image file within an install directory of the second partition and converting an OS operating on the host computing device from the first OS to the second OS. The OS image file installs the second OS on a second data storage device of the host computing device from the install directory.

In yet another aspect, at least one non-transitory computer-readable storage media having computer-executable instructions embodied thereon is provided. When executed by at least one processor, the computer-executable instructions cause the processor to generate a custom archive file for a host computing device having a first OS. The custom archive file including an OS image file associated with a second OS. The computer-executable instructions further cause the processor to format a first data storage device of the host computing device to include a first partition associated with the first OS and a second partition associated with the second OS, transmit the custom archive file to the host computing device, and generate, using the custom archive file, a loopback file system mounted to the host computing device to emulate a physical data storage device. The OS image file is accessible though the loopback file system. The computer-executable instructions further cause the processor to store the OS image file within an install directory of the second partition and convert an OS operating on the host computing device from the first OS to the second OS. The OS image file installs the second OS on a second data storage device of the host computing device from the install directory.

BRIEF DESCRIPTION OF THE DRAWINGS

FIG. 1 is a block diagram illustrating an example operating system conversion (OSC) system for converting a host computing device from a first operating system to a second operating system in accordance with one embodiment of the disclosure.

FIG. 2 is an example data flow diagram of an operating system conversion process using the system shown in FIG. 1.

FIG. 3 is an expanded block diagram of an example embodiment of a remote device for use in the system shown in FIG. 1.

FIG. 4 illustrates an example configuration of a host system for use in the system shown in FIG. 1.

FIG. 5 is a flowchart of an example process for converting operating systems using the system shown in FIG. 1.

FIG. 6 is a diagram of components of one or more example computing devices that may be used in embodiments of the described systems and methods.

DETAILED DESCRIPTION

Figure 1:
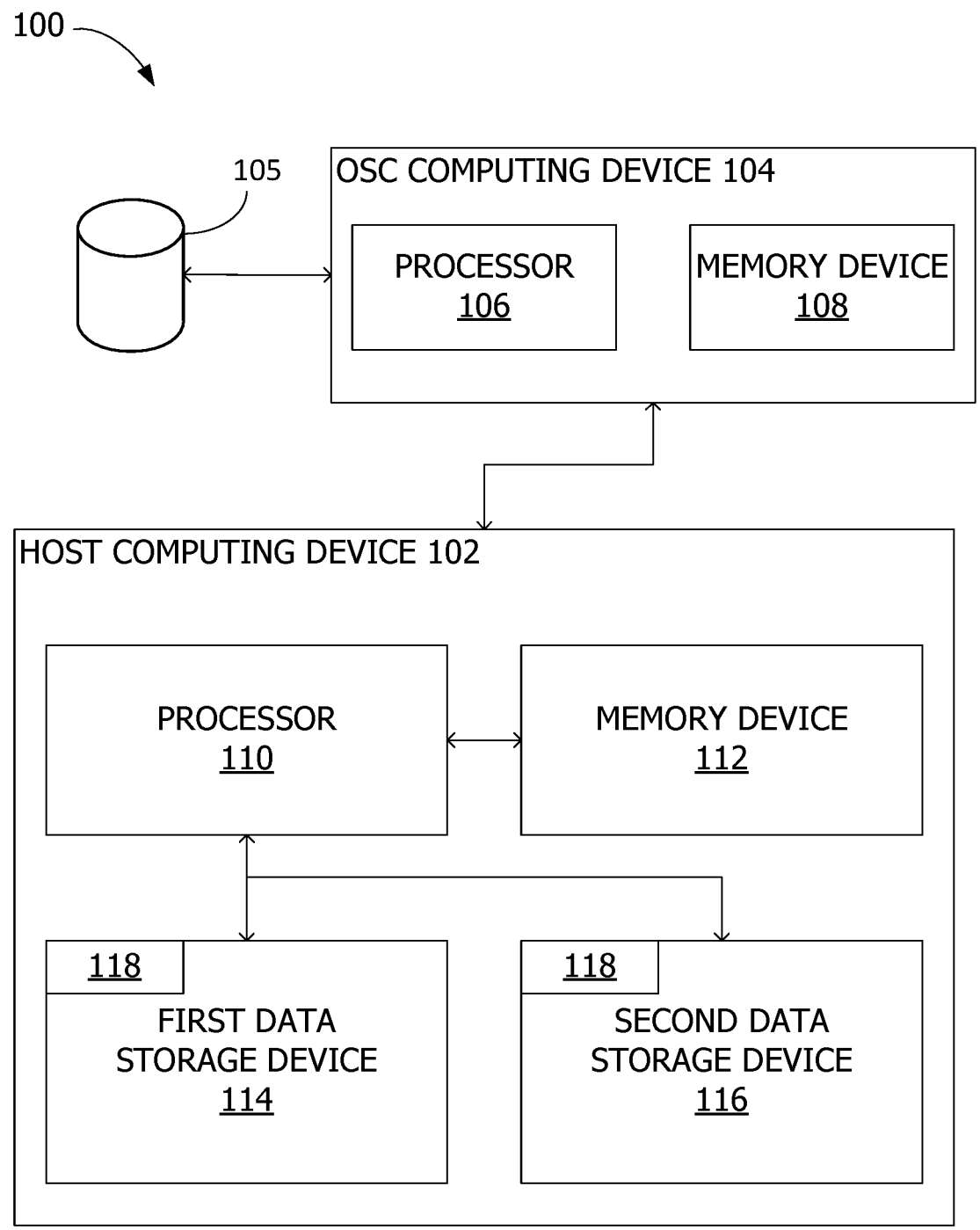
FIGS. 1-6 show example embodiments of the methods and systems described herein.

Systems and method according to this disclosure are directed to converting an operating system on a host computing device from a first operating system to a second operating system using an operating system conversion system. More specifically, this disclosure describes a network-based system and method that includes an operating system conversion system that is configured to remotely convert an operating system on a host computing device from a first operating system to a second operating system.

The operating system conversion (OSC) system described herein facilitates installation of an operating system (OS) at a host computing device without requiring physical access to the host computing device. In the example embodiment, the OSC system includes an OSC computing device communicatively coupled to a host computing device that is configured to perform one or more services or processes. In one example, the host computing device is configured to store, generate, receive, and transmit data associated with a payment network. The payment network is a closed network (e.g., private or secure) having specific messaging protocols that is configured to enable various parties involved in payment transactions to communicate with each other to authenticate, authorize, settle, and/or otherwise process payment transactions using payment account and payment cards (e.g., credit and debit cards). In other embodiments, the host computing device is configured to perform a variety of different services or processes.

The host computing device includes at least a first data storage device and a second data storage device. In other embodiments, the host computing device includes additional data storage devices. The first and second data storage devices may be hard disk drives (HDDs), solid state drives (SSDs), and/or any other suitable type of data storage. Each data storage device includes one or more partitions. In at least some embodiments, the partitions may include a plurality of slices. Each slice may be configured to include different file system architectures supported by the OS associated with the partition. In at least some embodiments, the first and second data storage devices are configured in a multiple disk (MD) array for data redundancy, increased storage, and/or improved performance. For example, the first and second data storage devices may be in a redundant array of independent disks (RAID) configuration, such as RAID 1 or RAID 5.

In the example embodiment, the first and second data storage devices include at least one partition associated with a first OS (also sometimes referred to herein as the "installed OS" or the "previous OS"). That is, the partitions associated with the first OS store OS data for the first OS and/or are formatted according to specific file system architecture supported by the first OS, thereby enabling the first OS to read and write data from the partitions.

In at least some embodiments, the installed OS may be replaced by a new OS ("second OS"). For example, if the installed OS is depreciated due to lack of support, a new OS may be installed on the host computing device. To convert to the host computing device to a second OS, the OSC computing device is configured to perform an OS conversion process for the host computing device. That is, the OSC computing device is configured to facilitate installing the second OS on the host computing device without requiring a technician to have physical access to the host computing device (e.g., to use portable physical data storage devices to install the second OS). In addition, the OSC computing device is configured to install the second OS without removing the first OS, thereby enabling the host computing device to operate using the first OS if necessary.

In the example embodiment, to begin the OS conversion process, the OSC computing device is configured to retrieve an archive file associated with the second OS. In at least some embodiments, the archive file is retrieved from a database communicatively coupled to the OSC computing device. The archive file stores data for installing the second OS in a compressed format, thereby facilitating reduced retrieval times and reduced storage space to store the data. The archive file may be, for example, an ISO file formatted in accordance to standards set by the International Standards Organization (e.g., ISO-9660). In the example embodiment, the archive file includes an OS image file that emulates a physical data storage device. The OS image file includes the data to install the second OS on a data storage device, such as an installation kernel, software packages, and the like.

In certain embodiments, the archive file may be too large to use in the OS conversion process. In one example, at least some file system architectures described herein may not support operations (read, write, etc.) on data files over four gigabytes (GB). In such embodiments, the OSC computing device is configured to extract the OS image file from the archive file and remove one or more software packages from the OS image file. The software packages include one or more data files that provide one or more applications to the second OS. The removed packages may be manually removed from the OS image file to remove unnecessary or unwanted software applications. Alternatively, the packages to remove may be predefined such that the OSC computing device automatically removes the software packages. For example, in embodiments in which the OSC computing device is converting multiple host computing devices to the second OS, the removal of the packages may be repeated several times and thus is automated to reduce the amount of user input required.

In the example embodiment, the OSC computing device is configured to generate a kickstart file associated with the second OS. A kickstart file is a set of predefined instructions that, when executed, facilitate installing the second OS in accordance with settings defined by the set of instructions automatically without requiring manual input from a user. During installation of the second OS as described herein, the second OS (or a bootloader) may detect the kickstart file and automatically perform the set of instructions. In the example embodiment, the OSC computing device stores a kickstart template for generating the kickstart file. The kickstart template includes one or more definition variables that are populated with environment information specific to the host computing device, such as, but not limited to, a host name, internet protocol (IP) address, netmask, default network gateway, network speed, and a disk size associated with the first and second data storage devices. In some embodiments, the OSC computing device requests the environment information from the host computing device and populates the kickstart template with the received environment information to generate the kickstart file. In other embodiments, the OSC computing device may generate a script including the kickstart template to cause the host computing device to populate the template. A script is a set of computer instructions that, when executed by a computing device, cause the computing device to perform one or more tasks automatically.

After the kickstart file is generated, the OSC computing device is configured to generate a custom archive file for the second OS. The custom archive file includes the OS image file and the kickstart file in a compressed format. In some embodiments, the custom archive file may also include other data, such as data files or other scripts configured for the second OS. The custom archive file is used to facilitate transfer and storage of the OS image file and the kickstart file at the host computing device.

In the example embodiment, the OSC computing device is configured to control operation of the host computing device. That is, instructions (e.g., command line instructions) received by the host computing device from the OSC computing device are performed without requiring physical access to the host computing device. Although the OSC computing device is described herein as performing steps of the OS conversion process, it is to be understood that performing the steps of the OS conversion process may include the OSC computing device controlling the host computing device to perform the steps. In one embodiment, the OSC computing device is configured to provide the instructions for the OS conversion process individually to the host computing device. In other embodiments, the OSC computing device generates a script for the OS conversion process and transmits the script to the host computing device.

The OSC computing device is configured to create one or more partitions on one of the data storage devices within the host computing device for the second OS. In the example embodiment, the OSC computing device begins by checking a status of the data storage devices to determine if either data storage device is in a degraded or failed state. If either data storage device is in a degrade state, the OSC computing device may terminate the OS conversion process to facilitate repairing and/or replacing the degraded data storage device. The data storage devices are configured in an array of partitions in accordance with protocols supported by the first OS. More specifically, the data storage devices store metadata that defines the array of partitions between the first and second data storage devices. In other embodiments, the data storage devices are not in an array, but rather store data independent of each other. In the example embodiment, the OSC computing device detaches the first data storage device from the array of partitions by updating the metadata stored by the first and second data storage devices to remove the partition(s) of the first data storage device.

The OSC computing device is configured to format the first data storage device to include a first partition associated with the first OS and a second partition associated with the second OS. More specifically, the OSC computing device updates a partition table stored by the first data storage device to include the first and second partitions in a specific file system architecture supported by the first and second OSes, respectively. Some file system architectures may be supported by both OSes, such as File Allocation Table 32-bit (FAT32). The partition table is metadata stored by the data storage devices indicating the name, size, and file system architecture of each partition within a respective data storage device.

The OSC computing device creates a file system supported by the second OS on the second partition of the first data storage device to facilitate storing the data within the custom archive file and installing the second OS on the second data storage device (or another data storage device of the host computing device). In the example embodiment, the file system is a FAT file system, and more specifically, a FAT32 file system. In other embodiments, the file system is a different file system supported at least by the second OS.

The OSC computing device then formats the first partition to match a size of a third partition associated with the first OS on the second data storage device. More specifically, at least one slice of the first partition is configured to mirror corresponding slices of the third partition. The slices of the first and third partitions store data associated with the first OS. The first partition is then rejoined to the array of partitions by updating the metadata stored by the first and second data storage devices to include a reference pointer to the first partition. By matching the first partition with the third partition, the data storage devices continue to operate in a mirrored state (i.e., a redundant array) for the first OS.

In the example embodiment, the OSC computing device mounts (i.e., provides access to) the second partition to a file system supported by the first OS, thereby enabling the host computing device to access (i.e., read and write) the second partition. In one embodiment, the second partition is mounted to a personal computer file system (PCFS). The PCFS is configured to enable the first OS to access the second partition using protocols supported by the first OS. The PCFS may be configured to also facilitate access by the second OS when the second OS is installed. In the example embodiment, the OSC computing device transmits the custom archive file for storage in the second partition. In some embodiments, the OSC computing device is configured to support the file system architecture of the second partition and directly stores the custom archive file. In other embodiments, the host computing device receives the custom archive file and stores the custom archive file in the second partition using the PCFS.

The OSC computing device is configured to generate a loopback file system using the custom archive file. The loopback file system causes the custom archive file to emulate a physical data storage device to provide access to the data within the custom archive file (i.e., the OS image file and the kickstart file). That is, the custom archive file is treated like a data storage device by the first OS. The loopback file system may also cause the OS image file to emulate a data storage device, thereby providing access to the data within the OS image file (e.g., an installation kernel, installation repositories, software packages, etc.). The OSC computing device mounts the loopback filesystem to the host computing device to provide access to the loopback file system. In one example, the OSC computing device mounts the loopback file system to the host computing device as a compact disk read-only memory (CD-ROM). More specifically, the OSC computing device mounts the loopback file system in a directory associated with CD-ROMs. In another example, the OSC computing device mounts the loopback file system as a universal serial bus (USB) device.

After the loopback file system is mounted, the OSC computing device creates an install directory within the second partition to store the data from the OS image file. The install directory is an identifiable location within a file system for storing files and other directories. In the example embodiment, the install directory is created on the second partition via the PCFS supported by the first OS. The OS image file and the kickstart file are then stored in the install directory and the loopback file system is unmounted from the host computing device. In at least some embodiments, the data files within the OS image files (e.g., the installation kernel, software packages, etc.) are extracted and stored within the install directory.

After the install directory is populated, the OS computing device is configured to convert an OS operating on the host computing device from the first OS to the second OS. In at least some embodiments, the OSC computing device may update a bootloader of the host computing device to identify the install directory. The bootloader is a software application that loads or initiates OSes on the host computing device. The bootloader has an associated boot menu that identifies the different OSes that can be initiated. In the example embodiment, the boot menu includes a boot identifier for each entry on the boot menu that points to an OS stored within the data storage devices. The OSC computing device creates a boot identifier associated with the install directory and updates the boot menu to include the created boot identifier. In some embodiments, the created boot identifier references the install directory and/or the OS image file. In other embodiments, the created boot identifier references the second partition or the first data storage device. In such embodiments, the bootloader scans the partition or data storage device to identify any stored OS image files. In the example embodiment, the OSC computing device updates the bootloader to set the created boot identifier as the default option (i.e., when the host computing device is rebooted, the second OS is automatically initiated). In at least some embodiments, the OSC computing device is configured to add a reference pointer associated with the kickstart file to the boot identifier of the second OS. In such embodiments, when the second OS is initialized to begin installation, the bootloader is configured to identify the kickstart file based on the reference pointer in the boot identifier and cause the instructions stored in the kickstart file to be performed automatically to install the second OS.

In the example embodiment, the host computing device is then rebooted to begin the install process of the second OS on the second data storage device. At least some of the data stored on the second data storage device may be backed up prior to the reboot. The kickstart file causes the host computing device to automatically install and configured the second OS in accordance with predefined configuration settings. For example, the kickstart file may configure the host name, the interfaces, and/or the disk layout of the host computing device. In the example embodiment, the kickstart file causes the data within the second data storage device to be removed to facilitate installation of the second OS on the second data storage device. The kickstart file does not remove the first OS from the host computing device completely to enable fallback to operating with the first OS if any issues occur with the second OS. That is, the first OS is stored on the first data storage device to facilitate dual-booting (i.e., selecting between the first and second OSes each time the host computing device is turned on or restarted).

In at least some embodiments, the host computing device operates using the second OS for a period of time for testing. After a determination is made to fully switch to the second OS, the first OS is removed from the data storage devices and the data storage devices are configured in a multiple disk array within the second OS for data redundancy. In particular, a data alignment process is performed (e.g., by the host computing device) to format the first and second data storage devices to mirror each other for the array while limiting the impact of the formatting on the services or processes performed by the host computing device.

The kickstart file may be configured to format the data storage devices during the installation of the second OS to facilitate the data alignment process. In one example, the kickstart file is configured to create an array of partitions on the second data storage device. The array of partitions is a redundant array of partitions (i.e., each partition in the array has at least one matching partition). The kickstart file is configured to identify a portion of the partitions as failed partitions or devices. More specifically, the kickstart file updates metadata associated with the array of partitions to identify the portion of the partitions as failed partitions. The array of partitions includes a first subset of partitions that are 'active' (i.e., not failed partitions) and a second subset of partitions that are failed partitions. Creating failed partitions facilitates taking advantage of 'hot-swap' capabilities of redundant arrays. Hot-swapping is a feature that enables replacement partitions or data storage devices to replace failed devices without additional configuration. Accordingly, during the data alignment process, the failed partitions are removed from the array of partitions and the first data storage device is configured to store a new subset of partitions to replace the failed partitions in the array without requiring multiple reboots of the host computing device. The first subset of partitions on the second data storage device and the new subset of partitions on the first data storage device are then aligned to match each other and complete the data alignment process.

The methods and systems described herein may be implemented using computer programming or engineering techniques including computer software, firmware, hardware or any combination or subset thereof, wherein the technical effects may be achieved by performing one of the following steps: (i) generate a kickstart file for a host computing device having a first or installed OS, the kickstart file including environment information associated with the host computing device; (ii) retrieve an archive file associated with a second or new OS that includes an OS image file of the second OS; (iii) extract the OS image file from the archive file; (iv) remove at least one software package from the OS image file; (v) generate a custom archive file that includes the OS image file and the kickstart file; (vi) format a first data storage device of the host computing device to include a first partition associated with the first OS and a second partition associated with the second OS; (vii) transmit the custom archive file to the host computing device; (viii) mount the second partition to a PCFS to enable the first OS to access the second partition; (ix) generate, using the custom archive file, a loopback file system mounted to the host computing device to provide access to the OS image file and the kickstart file within the custom archive file; (x) store the OS image file and the kickstart file within an install directory of the second partition for installing the second OS on a second data storage device of the host computing device; and (xi) convert an OS operating on the host computing device from the first OS to the second OS based on the OS image file and the kickstart file.

The systems and methods described herein are configured to facilitate (a) reducing bandwidth and processing interference with services and processes using data stored on data storage devices converting to a new OS; (b) reducing professional overview by automating the OS conversion process using scripts; (c) reducing installation costs by enabling installation without the use of physical contact with the host computing device, thereby reducing travel, labor, and equipment (e.g., installation media) costs; (d) improved data transfer and processing speeds of OS image files by removing packages prior to the OS conversion process; and (e) improved data security by providing the option to return to the initial OS while testing the new OS.

Described herein are computer systems such as a host computing device and an OSC computing device. As described herein, all such computer systems include a processor and a memory.

Further, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

The systems and processes are not limited to the specific embodiments described herein. In addition, components of each system and each process can be practiced independent and separate from other components and processes described herein. Each component and process also can be used in combination with other assembly packages and processes.

The following detailed description illustrates embodiments of the disclosure by way of example and not by way of limitation. It is contemplated that the disclosure has general application to converting operating systems for remote host computing devices.

FIG. 1 is a block diagram of an example operating system conversion (OSC) system 100 for converting a host computing device 102 from a first operating system (OS) to a second OS. In the example embodiment, system 100 includes an OSC computing device 104 communicatively coupled to host computing device 102. OSC computing device 104 includes a processor 106 and a memory device 108 in communication with processor 106. OSC computing device 104 is in communication with a database 105 for storing and retrieving scripts, kickstart files, OS images, and the like as described herein. In other embodiments, system 100 may include additional, fewer, or alternative components, including those described elsewhere herein.

Host computing device 102 includes a processor 110, a memory device 112 in communication with processor 110, a first data storage device 114 and a second data storage device 116. In some embodiments, first and/or second data storage devices 114, 116 are physically separate from host computing device 102. For example, first and second data storage devices 114, 116 may be configured as a network attached storage (NAS) in communication with host computing device 102. In some embodiments, host computing device 102 may include three or more data storage devices.

In the example embodiment, first and second data storage devices 114, 116 are configured in a multiple disk array for data redundancy. In one example, data storage devices 114, 116 are in a RAID1 configuration. Data storage devices 114, 116 store array metadata 118 that defines the structure of the array. To add devices, remove devices, or otherwise adjust the configuration of the array, host computing device 102 modifies array metadata 118 in each data storage device associated with the array.

Host computing device 102 is configured to provide one or more processes or services associated with data stored in first and second data storage devices 114, 116. For example, host computing device 102 may be configured to facilitate data communication in a payment network between different parties, such as to transmit and receive messages regarding authentication, authorization, settlement, and/or otherwise processing payment transactions in the payment network. In other embodiments, host computing device 102 is configured to provide a different services or process using the data stored in data storage devices 114, 116.

When a determination is made to transition host computing device 102 from the first OS to the second OS, OSC computing device 104 is configured to perform an OS conversion process. The OS conversion process installs the second OS on second data storage device 116 while maintaining the first OS on first data storage device 114 until a full conversion to the second OS is performed. OSC computing device 104 is configured to enable the OS conversion process to be performed without requiring physical access to host computing device 102 to manually insert physical media (e.g., CD-ROMs, USB devices, etc.) into host computing device to install the second OS.

Figure 2:
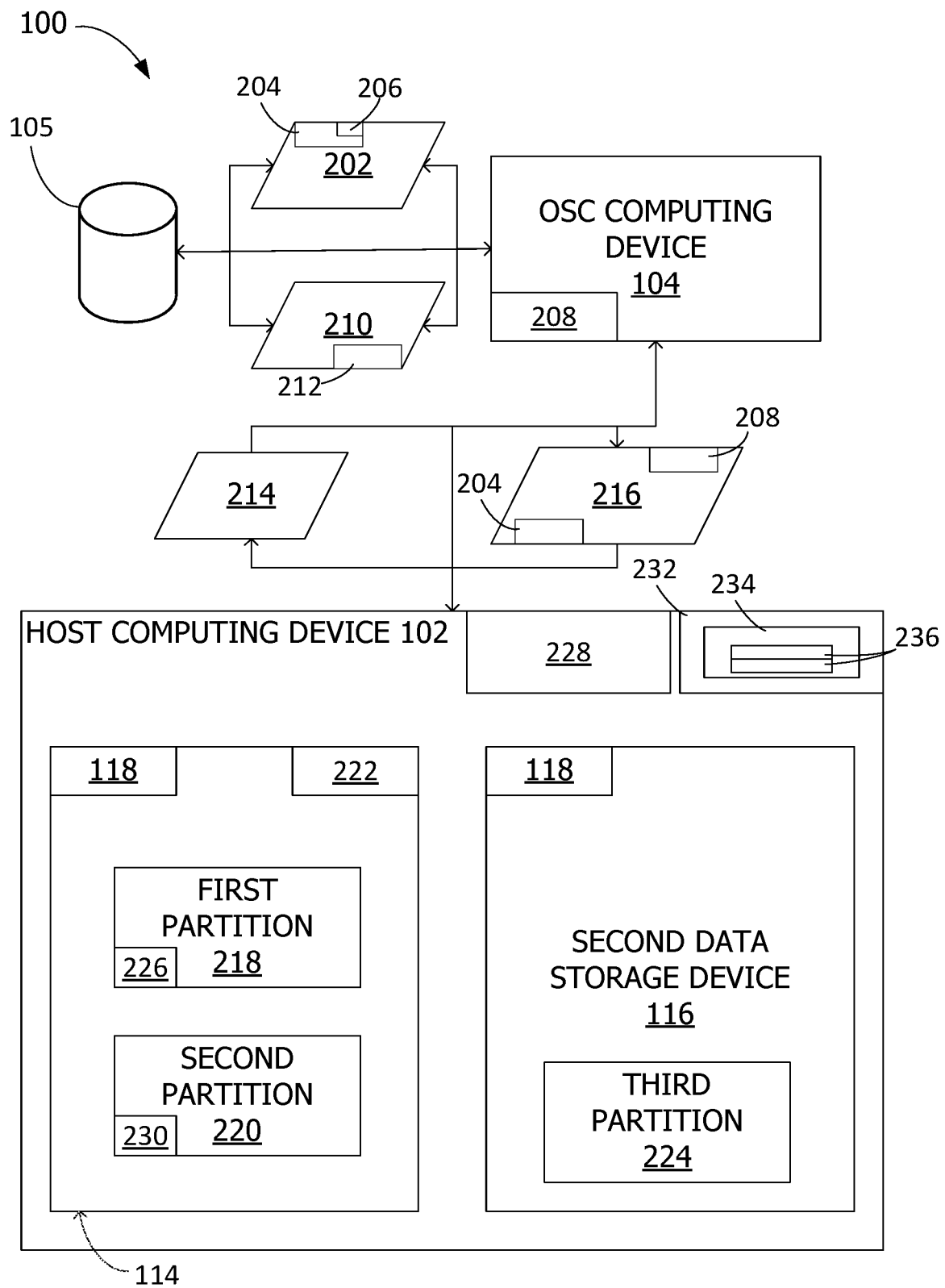

FIG. 2 is a data flow diagram during an example OS conversion process performed by system 100 shown in FIG. 1. In other embodiments, the OS conversion process may include additional, fewer, or alternative data and/or steps, including those described elsewhere herein.

In the example embodiment, to begin the OS conversion process, OSC computing device 104 is configured to retrieve an archive file 202 associated with the second OS. In at least some embodiments, archive file 202 is retrieved from database 105. Archive file 202 stores data for installing the second OS in a compressed format, thereby facilitating reduced retrieval times and reduced storage space to store the data. Archive file 202 may be, for example, an ISO file formatted in accordance to standards set by the International Standards Organization (e.g., ISO-9660). In the example embodiment, archive file 202 includes an OS image file 204 that emulates a physical data storage device. OS image file 204 includes the data to install the second OS on a data storage device. For example, OS image file 204 may include an installation kernel, installation repositories, and/or software packages associated with the second OS.

In certain embodiments, archive file 202 may be too large to use in the OS conversion process. In one example, at least some file system architectures may not support operations (read, write, etc.) on data files over four gigabytes (GB). In such embodiments, OSC computing device 104 is configured to extract OS image file 204 from archive file 202 and remove one or more software packages 206 from OS image file 204. Software packages 206 include one or more data files that provide one or more applications to the second OS. The removed packages 206 may be manually removed from OS image file 204 to remove unnecessary or unwanted software applications. Alternatively, packages 206 to remove may be predefined such that OSC computing device 104 automatically removes software packages 206. For example, in embodiments in which OSC computing device 104 is converting multiple host computing devices 102 to the second OS, the removal of packages 206 may be repeated several times and thus is automated to reduce the amount of user input required.

In the example embodiment, OSC computing device 104 is configured to generate a kickstart file 208 associated with the second OS. Kickstart file 208 is a set of predefined instructions that, when executed, facilitate installing the second OS in accordance to settings defined by the set of instructions automatically without requiring manual input from a user. During installation of the second OS as described herein, the second OS (or a bootloader) may detect kickstart file 208 and automatically perform the set of instructions. In the example embodiment, OSC computing device 104 stores a kickstart template 210 in database 105 for generating kickstart file 208. Kickstart template 210 includes one or more definition variables 212 that are populated with environment information 214 specific to host computing device 102, such as, but not limited to a host name, internet protocol (IP) address, netmask, default network gateway, network speed, and a disk size associated with first and second data storage devices 114, 116. In some embodiments, OSC computing device 104 requests environment information 214 from host computing device 102 and populates kickstart template 210 with the received environment information 214 to generate kickstart file 208. In other embodiments, OSC computing device 104 may generate a script (not shown) including kickstart template 210 to cause host computing device 102 to populate template 210.

After kickstart file 208 is generated, OSC computing device 104 is configured to generate a custom archive file 216 for the second OS. Custom archive file 216 includes OS image file 204 and kickstart file 208 in a compressed format. In some embodiments, custom archive file 216 may further include other data, such data files or other scripts for the second OS. Custom archive file 216 is used to facilitate transfer and storage of OS image file 204 and kickstart file 208 at host computing device 102.

In the example embodiment, OSC computing device 104 is configured to control operation of host computing device 102. That is, instructions (e.g., command line instructions) received by host computing device 102 from OSC computing device 104 are performed without requiring physical access to host computing device 102. Although OSC computing device 104 is described herein as performing steps of the OS conversion process, it is to be understood that performing the steps of the OS conversion process may include controlling host computing device 102 to perform the steps. In one embodiment, OSC computing device 104 is configured to provide the instructions for the OS conversion process individually to host computing device 104. In other embodiments, OSC computing device 104 generates a script for the OS conversion process and transmits the script to host computing device 102.

OSC computing device 104 is configured to create one or more partitions on first data storage device 114 for the second OS. In the example embodiment, OSC computing device 104 begins by checking a status of data storage devices 114, 116 to determine if either data storage device 114 or 116 is in a degraded or failed state. If either data storage device 114, 116 is degraded or failed, the OS conversion process may be terminated until the degraded or failed data storage device is fixed. In the example embodiment, OSC computing device 104 detaches first data storage device 114 from the array of partitions by updating metadata 118 stored by first and second data storage devices 114, 116 to remove data associated with the partition(s) of first data storage device 114.

OSC computing device 104 is configured to format first data storage device 114 to include a first partition 218 associated with the first OS and a second partition 220 associated with the second OS. More specifically, OSC computing device 104 updates a partition table 222 stored by first data storage device 114 to include first and second partitions 218, 220 in a specific file system architecture supported by the first and second OSes, respectively. In the example embodiment, the file system architecture associated with second partition 220 is supported by both OSes, such as File Allocation Table 32-bit (FAT32). In certain embodiments, the file system architecture associated with first partition 218 may also be supported by both OSes. Partition table 222 is metadata stored by data storage devices 114, 116 indicating the name, size, and file system architecture of each partition within a respective data storage device.

OSC computing device 104 creates a file system on second partition 220 of first data storage device 114 to facilitate storing the custom archive file and installing the second OS. In the example embodiment, the file system is a FAT file system, and more specifically, a FAT32 file system.

In other embodiments, the file system is a different file system supported by the first OS and the second OS.

OSC computing device 104 then formats first partition 218 to match a size of a third partition 224 associated with the first OS on second data storage device 116. More specifically, at least one slice of first partition 218 is configured to be mirrored with corresponding slices of third partition 224. The mirrored slices are configured to store data associated with the first OS. First partition 218 is then rejoined to the array of partitions by updating array metadata 118 stored by first and second data storage devices 114, 116 to include a reference pointer to first partition 218. By matching first partition 218 with third partition 224, data storage devices 114, 116 continue to operate in a mirrored state (i.e., a redundant array) for the first OS until the second OS is installed.

In the example embodiment, OSC computing device 104 mounts (i.e., provides access to) second partition 220 to a file system 226 supported by the first OS, thereby enabling host computing device 102 to access (i.e., read and write) second partition 220. In one embodiment, second partition 220 is mounted to a personal computer file system (PCFS) 226. PCFS 226 is configured to enable the first OS to access second partition 220 using protocols supported by the first OS. In some embodiments, PCFS 226 may be configured to enable the second OS to access first and/or second partitions 218, 220. In the example embodiment, OSC computing device 104 transmits custom archive file 216 for storage in second partition 220. In some embodiments, OSC computing device 104 is configured to support the file system architecture of second partition 220 and directly stores custom archive file 216. In other embodiments, host computing device 102 receives custom archive file 216 and stores custom archive file 216 in second partition 220 using PCFS 226.

OSC computing device 104 is configured to generate a loopback file system 228 using custom archive file 216. Loopback file system 228 causes custom archive file 216 to emulate a physical data storage device to provide access to the data within custom archive file 216 (i.e., OS image file 204 and kickstart file 208). That is, custom archive file 216 is treated like a data storage device by the first OS. In the example embodiment, loopback file system 228 is further configured to cause OS image file 204 to emulate a data storage device, thereby facilitating access to the data within OS image file 204 (e.g., installation kernel, installation repositories, etc.). OSC computing device 104 mounts loopback filesystem 228 to host computing device 102 to provide access to loopback file system 228. In one example, OSC computing device 10 mounts loopback file system 228 to host computing device 102 as a CD-ROM. In another example, OSC computing device 104 mounts loopback file system 228 as a USB device.

After loopback file system 228 is mounted, OSC computing device 104 creates an install directory 230 within second partition 220 to store OS image file 204. Install directory 230 is an identifiable location within a file system for storing files and other directories. In the example embodiment, install directory 230 is created on second partition 220 via the PCFS 226 supported by the first OS. OS image file 204 and kickstart file 208 are then stored in install directory 230 and loopback file system 228 is unmounted from host computing device 102.

After install directory 230 is populated, OSC computing device 104 is configured to convert an OS operating on host computing device 102 from the first OS to the second OS. In at least some embodiments, OSC computing device 104 may update a bootloader 232 of host computing device 102 to identify install directory 230. Bootloader 232 is a software application that loads or initiates OSes on host computing device 102. Bootloader 232 has an associated boot menu 234 that identifies the different OSes that can be initiated. In the example embodiment, boot menu 234 includes a boot identifier 236 for each entry on boot menu 234 that points to an OS stored within data storage devices 114, 116. OSC computing device 104 creates a boot identifier 236 associated with install directory 230 and updates boot menu 234 to include the created boot identifier 236. In some embodiments, the created boot identifier 236 references install directory 230 and/or OS image file 204. In other embodiments, the created boot identifier 236 references second partition 220 or first data storage device 114. In such embodiments, bootloader 232 scans the referenced partition or data storage device to identify any stored OS image files. In the example embodiment, OSC computing device 104 updates bootloader 232 to set the created boot identifier 236 as the default option (i.e., when host computing device 102 is rebooted, the second OS is automatically initiated). In at least some embodiments, boot identifier 236 includes a reference pointer associated with kickstart file 208. When bootloader 232 selects boot identifier 236 to start the second OS, kickstart file 208 is retrieved and executed to install the second OS.

In the example embodiment, host computing device 102 is then rebooted to begin an install process of the second OS on second data storage device 116. At least some of the data stored on second data storage device 116 may be backed up prior to the reboot. Kickstart file 208 causes host computing device 102 to automatically install and configured the second OS in accordance with predefined configuration settings. For example, kickstart file 208 may configure the host name, the interfaces, and/or the disk layout of host computing device 102 within the second OS. At least a portion of the data stored in second data storage device 116 is removed to install the second OS on second data storage device 116. Kickstart file 208 does not remove the first OS from host computing device 102 completely to enable fallback to operating with the first OS if any issues occur with the second OS. In the example embodiment, the first OS remains installed on first data storage device 114 while the second OS is installed on second data storage device 116. Second partition 220 may be used by the first and second OSes to transmit data with each other (e.g., for backing-up data) because second partition 220 has a file system architecture accessible by both OSes.

After testing and operating with the second OS, a determination may be made to fully convert host computing device 102 to the second OS. During a full conversion to the second OS, the first OS is removed from first data storage device 114 to install data associated with the second OS and data storage devices 114, 116 are configured in a redundant array to facilitate improved data security for the services and processes performed by host computing device 102.

Figure 3:
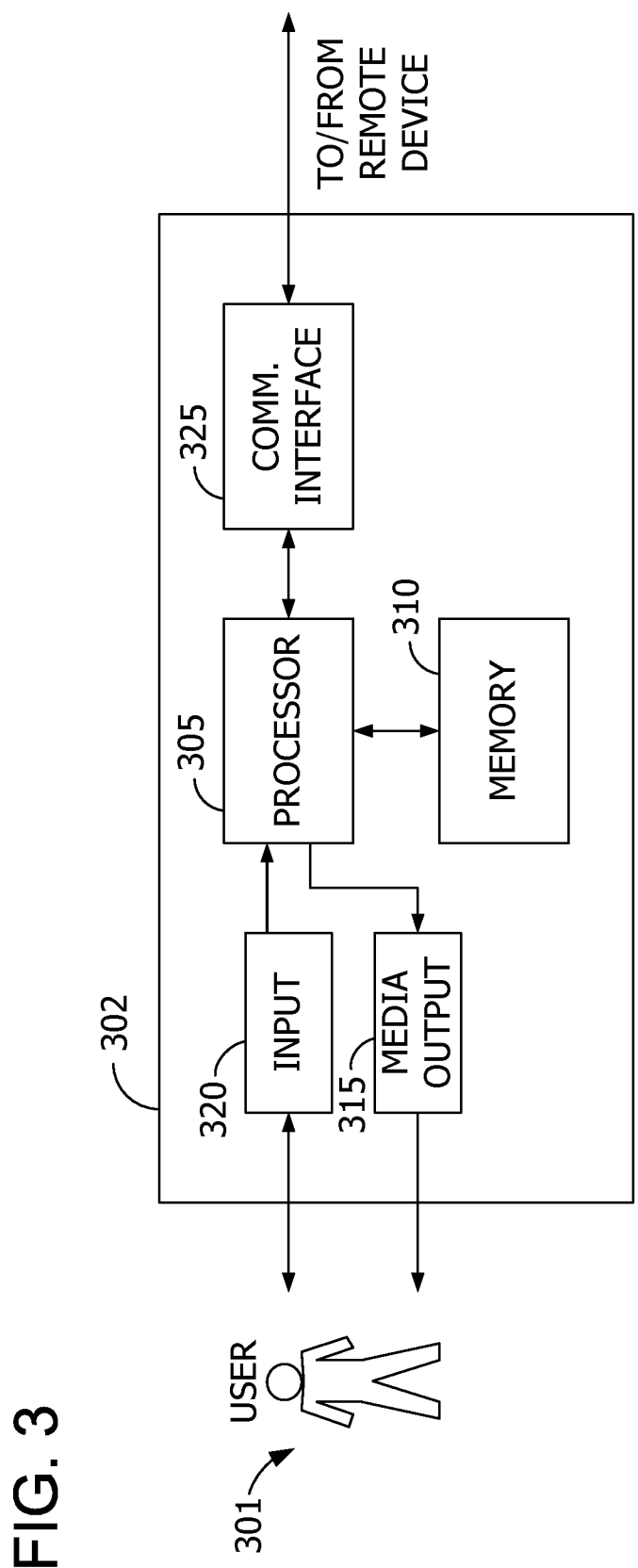

FIG. 3 depicts an exemplary configuration of a remote or user computing device 302, such as OSC computing device 104 (shown in FIG. 1). Computing device 302 may include a processor 305 for executing instructions. In some embodiments, executable instructions may be stored in a memory area 310. Processor 305 may include one or more processing units (e.g., in a multi-core configuration). Memory area 310 may be any device allowing information such as executable instructions and/or other data to be stored and retrieved. Memory area 310 may include one or more computer-readable media.

Computing device 302 may also include at least one media output component 315 for presenting information to a user 301. Media output component 315 may be any component capable of conveying information to user 301. In some embodiments, media output component 315 may include an output adapter, such as a video adapter and/or an audio adapter. An output adapter may be operatively coupled to processor 305 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones). In some embodiments, media output component 315 may be configured to present an interactive user interface (e.g., a web browser or client application) to user 301.

In some embodiments, computing device 302 may include an input device 320 for receiving input from user 301. Input device 320 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 315 and input device 320.

Computing device 302 may also include a communication interface 325, which may be communicatively coupleable to a remote device. Communication interface 325 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 310 are, for example, computer-readable instructions for providing a user interface to user 301 via media output component 315 and, optionally, receiving and processing input from input device 320. A user interface may include, among other possibilities, a web browser and client application. Web browsers enable users 301 to display and interact with media and other information typically embedded on a web page or a website from a web server. A client application allows users 301 to interact with a server application associated with, for example, a vendor or business.

Figure 4:
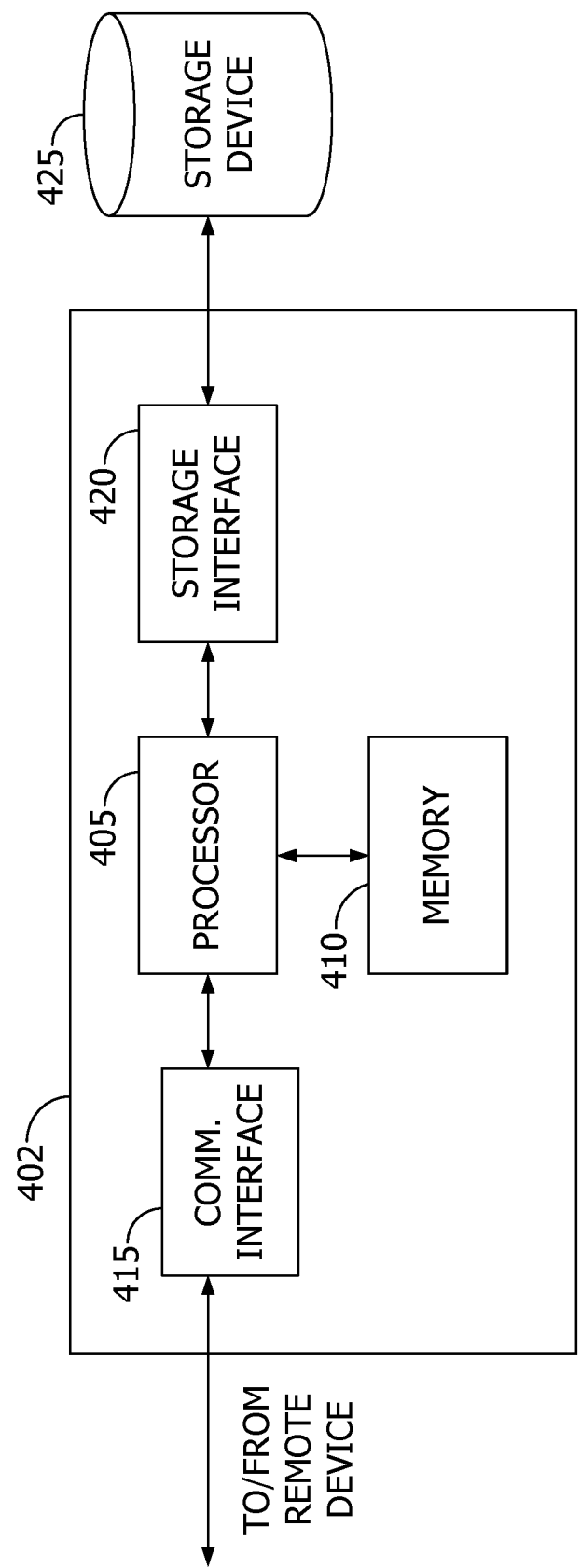

FIG. 4 depicts an exemplary configuration of a host computing device 402, such as host computing device 102 and OSC computing device 104 (both shown in FIG. 1). Host computing device 402 may include a processor 405 for executing instructions. Instructions may be stored in a memory area 410, for example. Processor 405 may include one or more processing units (e.g., in a multi-core configuration).

Processor 405 may be operatively coupled to a communication interface 415 such that host computing device 402 may be capable of communicating with a remote device such as computing device 302 shown in FIG. 3 or another host computing device 402. For example, communication interface 415 may receive requests from user computing device 302 via the Internet.

Processor 405 may also be operatively coupled to a storage device 425 (e.g., first and second data storage devices 108, 110, shown in FIG. 1). Storage device 425 may be any computer-operated hardware suitable for storing and/or retrieving data. In some embodiments, storage device 425 may be integrated in host computing device 402. For example, host computing device 402 may include one or more hard disk drives as storage device 425. In other embodiments, storage device 425 may be external to host computing device 402 and may be accessed by a plurality of host computing devices 402. For example, storage device 425 may include multiple storage units such as hard disks or solid state disks in a redundant array of inexpensive disks (RAID) configuration. Storage device 425 may include a storage area network (SAN) and/or a network attached storage (NAS) system.

In some embodiments, processor 405 may be operatively coupled to storage device 425 via a storage interface 420. Storage interface 420 may be any component capable of providing processor 405 with access to storage device 425. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 425.

Memory areas 310 (shown in FIG. 3) and 410 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 5:
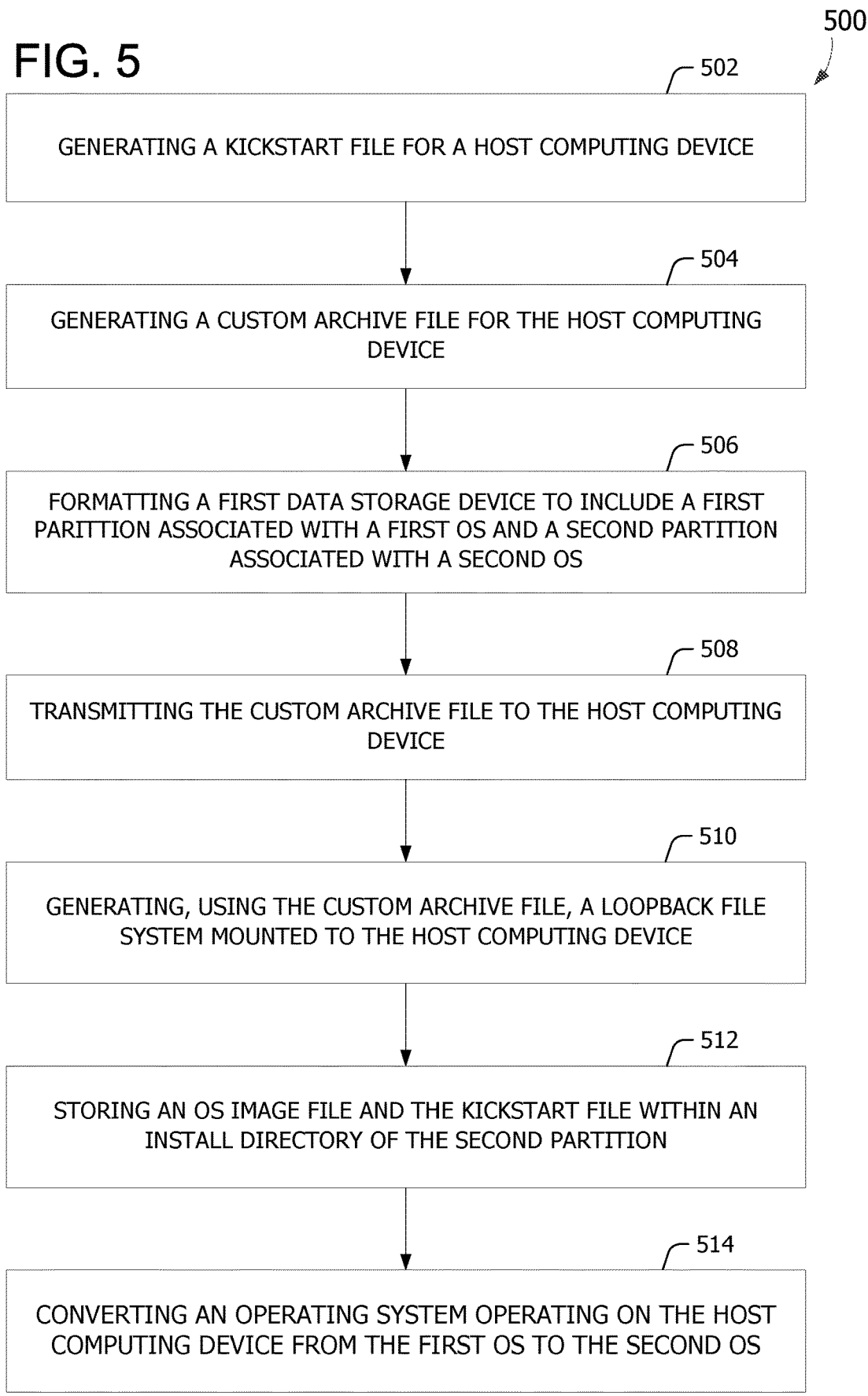

FIG. 5 is a flow diagram of an example method 500 for converting a host computing device from a first OS to a second OS using an OSC system, such as system 100 (shown in FIG. 1). Method 500 is at least partially performed by an OSC computing device (e.g., OSC computing device 104, shown in FIG. 1). In other embodiments, method 500 may include additional, fewer, or alternative steps, including those described elsewhere herein.

Method 500 begins with the OSC computing device generating 502 a kickstart file for the host computing device. In at least some embodiments, the OSC computing device retrieves a kickstart template and collects environment information from the host computing device. The kickstart template is automatically populated with the environment information to generate 502 the kickstart file. The OSC computing device generates 504 a custom archive file for the host computing device. The custom archive file includes an OS image file of the second OS and the kickstart file. In some embodiments, prior to generating 504 the custom archive file, the OSC computing device retrieves an archive file storing the OS image file, extracts the OS image file, and removes one or more software packages from the OS image file to reduce the size of the OS image file. The reduced OS image file is then added to the custom archive file.

The OSC computing device formats 506 a first data storage device of the host computing device to include a first partition associated with the first OS and a second partition associated with the second OS. The OSC computing device also transmits 508 the custom archive file to the host computing device to facilitate installation of the second OS. In at least some embodiments, the OSC computing device mounts the second partition to a PCFS of the first OS to facilitate access to the second partition from the first OS. The OSC computing device then generates 510, using the custom archive file, a loopback file system at the host computing device. The loopback file system is mounted to the host computing device to emulate a physical data storage device storing the OS image file and the kickstart file. The OSC computing device creates an install directory within the second partition and stores 512 the OS image file and the kickstart file within the install directory for installation of the second OS on a second data storage device of the host computing device. The OSC computing device then converts 514 an OS operating on the host computing device from the first OS to the second OS based at least in part on the OS image file and the kickstart file. In some embodiments, the OSC computing device updates a bootloader of the host computing device to identify the install directory and the kickstart file such that the bootloader can initiate the second OS and the kickstart file by accessing the data of the OS image file, such as an installation kernel.

Figure 6:
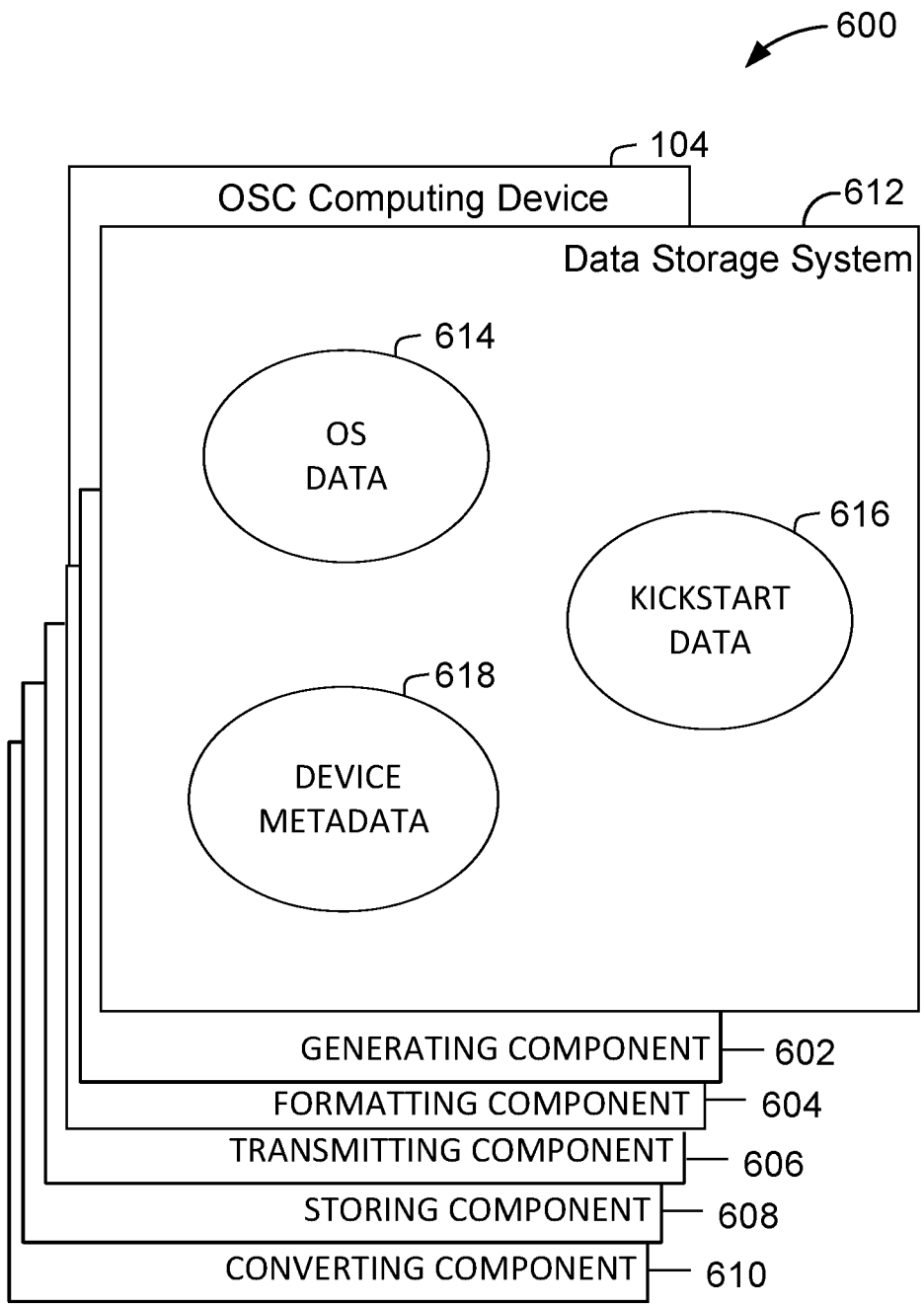

FIG. 6 is a diagram 600 of components of one or more example computing devices that may be used in the method shown in FIG. 5. FIG. 6 further shows a configuration of a data storage system 610 coupled to several separate components within OSC computing device 104 (shown in FIG. 1), which perform specific tasks.

OSC computing device 104 includes a generating component 602 configured to generate a kickstart file and a custom archive file for a host computing device. Generating component 602 is also configured to generate, using the custom archive file, a loopback file system mounted to the host computing device. OSC computing device 104 further includes a formatting component 604 configured to format a first data storage device of the host computing device to include a first partition associated with a first OS and a second partition associated with a second OS. OSC computing device 104 further includes a transmitting component 606 configured to transmit the custom archive file to the host computing device. OSC computing device 104 also includes a storing component 608 configured to store an OS image file and the kickstart file within an install directory of the second partition. OSC computing device 104 further includes a converting component 610 configured to convert an OS operating on the host computing device from the first OS to the second OS.

In an exemplary embodiment data storage system 612 is divided into a plurality of sections, including but not limited to, an OS data section 614, a kickstart data section 616, and a device metadata section 618. These sections are interconnected through OSC computing device 104 to update and retrieve the information as required.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An operating system conversion (OSC) computing device comprising at least one processor and a memory in communication with said at least one processor, wherein said at least one processor is programmed to:
   generate a custom archive file for a host computing device having a first operating system (OS), the custom archive file including an OS image file associated with a second OS;
   format a first data storage device of the host computing device to include a first partition associated with the first OS and a second partition associated with the second OS;
   transmit the custom archive file to the host computing device;
   generate, using the custom archive file, a loopback file system mounted to the host computing device to emulate a physical data storage device, wherein the OS image file is accessible though the loopback file system;
   store the OS image file within an install directory of the second partition, wherein the OS image file is configured to install the second OS on a second data storage device of the host computing device from the install directory; and
   convert an OS operating on the host computing device from the first OS to the second OS.

2. An OSC computing device in accordance with claim 1, wherein said at least one processor is further programmed to:
   generate a kickstart file for the host computing device, the kickstart file including environment information associated with the host computing device;
   add the kickstart file to the custom archive file; and
   store the kickstart file in the install directory, wherein the OS image file and the kickstart file are configured to install the second OS on the host computing device.

3. An OSC computing device in accordance with claim 2, wherein the kickstart file includes a set of predefined instructions to automatically install the second OS, wherein the set of predefined instructions are populated with the environment information.

4. An OSC computing device in accordance with claim 3, wherein the kickstart file is configured to create an array of partitions on the second data storage device for the second OS, the array of partitions including a first subset of partitions and a second subset of partitions, wherein the second subset of partitions are identified as failed partitions.

5. An OSC computing device in accordance with claim 1, wherein said at least one processor is further programmed to format the first partition to match a size of a third partition on the second data storage device of the host computing device for a redundant array of partitions.

6. An OSC computing device in accordance with claim 1, wherein said at least one processor is further programmed to mount the second partition to a personal computer file system (PCFS) to enable the first OS to access the second partition.

7. An OSC computing device in accordance with claim 1, wherein said processor is further programmed to:
retrieve an archive file associated with the second OS that includes the OS image file;
extract the OS image file from archive file;
remove at least one software package from the OS image file; and
generate the custom archive file.

8. An OSC computing device in accordance with claim 1, wherein the processor is further programmed to:
generate a boot identifier associated with the second OS, the boot identifier referencing the install directory and a kickstart file associated with the second OS;
update a boot menu of a bootloader associated with the host computing device to include the boot identifier; and
set the boot identifier as a default selection of the boot menu, wherein the host computing device is configured to automatically initiate the second OS and the kickstart file based on the boot identifier.

9. A method for converting a host computing device from a first operating system (OS) to a second OS, the host computing device including a first data storage device, said method comprising:
generating, by an OS conversion (OSC) computing device, a custom archive file for the host computing device, the custom archive file including an OS image file associated with the second OS;
formatting the first data storage device to include a first partition associated with the first OS and a second partition associated with the second OS;
transmitting the custom archive file to the host computing device;
generating, using the custom archive file, a loopback file system mounted to the host computing device to emulate a physical data storage device, wherein the OS image file is accessible though the loopback file system;
storing, by the OSC computing device, the OS image file within an install directory of the second partition, wherein the OS image file is configured to install the second OS on a second data storage device of the host computing device from the install directory; and
converting an OS operating on the host computing device from the first OS to the second OS.

10. A method in accordance with claim 9 further comprising:
generating, by the OSC computing device, a kickstart file for the host computing, the kickstart file including environment information associated with the host computing device;
adding the kickstart file to the custom archive file; and
storing the kickstart file in the install directory, wherein the OS image file and the kickstart file are configured to install the second OS on the host computing device.

11. A method in accordance with claim 10, wherein the kickstart file includes a set of predefined instructions to automatically install the second OS, wherein the set of predefined instructions are populated with the environment information.

12. A method in accordance with claim 11, wherein the kickstart file is configured to create an array of partitions on the second data storage device for the second OS, the array of partitions including a first subset of partitions and a second subset of partitions, wherein the second subset of partitions are identified as failed partitions.

13. A method in accordance with claim 9, wherein formatting the first data storage device further comprises formatting, by the OSC computing device, the first partition to match a size of a third partition on the second data storage device of the host computing device for a redundant array of partitions.

14. A method in accordance with claim 9, wherein transmitting the custom file archive to the host computing device further comprises mounting, by the OSC computing device, the second partition to a personal computer file system (PCFS) to enable the first OS to access the second partition.

15. A method in accordance with claim 9, wherein generating the custom archive file further comprises:
retrieving, by the OSC computing device, an archive file associated with the second OS that includes the OS image file;
extracting the OS image file from archive file;
removing, by the OSC computing device, at least one software package from the OS image file; and
generating the custom archive file.

16. A method in accordance with claim 9, wherein converting the OS operating on the host computing device further comprises:
generating, by the OSC computing device, a boot identifier associated with the second OS, the boot identifier referencing the install directory and a kickstart file associated with the second OS;
updating a boot menu of a bootloader associated with the host computing device to include the boot identifier; and
setting, by the OSC computing device, the boot identifier as a default selection of the boot menu, wherein the host computing device is configured to automatically initiate the second OS and the kickstart file based on the boot identifier.

17. At least one non-transitory computer-readable storage media having computer-executable instructions embodied thereon, wherein when executed by at least one processor, the computer-executable instructions cause the processor to:
generate a custom archive file for a host computing device having a first operating system (OS), the custom archive file including an OS image file associated with a second OS;
format a first data storage device of the host computing device to include a first partition associated with the first OS and a second partition associated with the second OS;
transmit the custom archive file to the host computing device;
generate, using the custom archive file, a loopback file system mounted to the host computing device to emulate a physical data storage device, wherein the OS image file is accessible though the loopback file system;
store the OS image file within an install directory of the second partition, wherein the OS image file is configured to install the second OS on a second data storage device of the host computing device from the install directory; and
convert an OS operating on the host computing device from the first OS to the second OS.

18. A computer-readable storage media in accordance with claim 17, wherein the computer-executable instructions further cause the processor to:
  generate a kickstart file for the host computing device, the kickstart file including environment information associated with the host computing device;
  add the kickstart file to the custom archive file; and
  store the kickstart file in the install directory, wherein the OS image file and the kickstart file are configured to install the second OS on the host computing device.

19. A computer-readable storage media in accordance with claim 18, wherein the kickstart file includes a set of predefined instructions to automatically install the second OS, wherein the set of predefined instructions are populated with the environment information.

20. A computer-readable storage media in accordance with claim 17, wherein the computer-executable instructions further cause the processor to format the first partition to match a size of a third partition on the second data storage device of the host computing device for a redundant array of partitions.

21. A computer-readable storage media in accordance with claim 17, wherein the computer-executable instructions further cause the processor to mount the second partition to a personal computer file system (PCFS) to enable the first OS to access the second partition.

22. A computer-readable storage media in accordance with claim 17, wherein the computer-executable instructions further cause the processor to:
  retrieve an archive file associated with the second OS that includes the OS image file;
  extract the OS image file from archive file;
  remove at least one software package from the OS image file; and
  generate the custom archive file.

* * * * *